(12) United States Patent
Helgerson

(10) Patent No.: US 10,780,992 B1
(45) Date of Patent: Sep. 22, 2020

(54) MOBILE EMERGENCY LANDING PAD

(71) Applicant: Nathan Helgerson, Pensacola, FL (US)

(72) Inventor: Nathan Helgerson, Pensacola, FL (US)

( * ) Notice: Subject to any disclaimer, the term of this patent is extended or adjusted under 35 U.S.C. 154(b) by 0 days.

(21) Appl. No.: 16/429,019

(22) Filed: Jun. 2, 2019

Related U.S. Application Data

(63) Continuation-in-part of application No. 15/648,279, filed on Jul. 12, 2017, now abandoned.

(51) Int. Cl.
*B64F 1/00* (2006.01)

(52) U.S. Cl.
CPC .............. *B64F 1/00* (2013.01); *B64F 1/007* (2013.01)

(58) Field of Classification Search
CPC ........... B64D 25/00; B62B 3/00; B64F 1/007; B64C 2025/325
See application file for complete search history.

(56) References Cited

U.S. PATENT DOCUMENTS

| | | | | |
|---|---|---|---|---|
| 2,850,252 A * | 9/1958 | Ford | ................... | B64F 1/36 244/114 R |
| 2,920,846 A * | 1/1960 | Lingafelter | ............... | E01F 3/00 244/114 R |
| 2,923,504 A * | 2/1960 | Ortega | ................... | B64F 1/10 244/114 R |
| 3,101,919 A * | 8/1963 | Madon | ................... | B64C 39/022 244/177 |
| 3,128,066 A * | 4/1964 | Bailey | ................... | B64F 1/10 244/114 R |
| 3,567,159 A * | 3/1971 | Klein | ................... | B64F 1/36 244/114 R |
| 3,677,425 A * | 7/1972 | Patten | ................... | B60P 3/1033 414/538 |
| 3,840,922 A * | 10/1974 | Morrison | ................ | A63B 6/02 482/15 |
| 3,851,730 A * | 12/1974 | Scurlock | ................ | A62B 1/22 182/137 |
| 4,171,114 A * | 10/1979 | Marden | ................. | B60P 3/11 114/261 |

(Continued)

OTHER PUBLICATIONS

Purple Line; "Air Opus Camper Trailer Introduction"; Mar. 2, 2017; YouTube; <https://www.youtube.com/watch?v=uHIDJgn5D-E>. (Year: 2017).*

(Continued)

*Primary Examiner* — Richard R. Green
*Assistant Examiner* — Michael A. Fabula
(74) *Attorney, Agent, or Firm* — Peter Loffler

(57) ABSTRACT

An emergency landing pad is used to capture a vertical landing capable aircraft that has a hung gear. The device is trailer based with the trailer having a series of wheels. At least one capture pad sits atop the trailer so that a portion of the aircraft lands atop the capture pad which cushions the fuselage of the aircraft. The capture pad is made from a resilient material, such as high-density foam, a rubber or similar materials. A cover is placed over the capture pad and one or more straps cinches the capture pad and the cover to the trailer. The cover may have markings on an outer surface thereof, which markings may be light reflective. The trailer is towed to the landing site via an ordinary tug and several trailers can be chained together in series in case more than one trailer is needed for aircraft capture.

15 Claims, 6 Drawing Sheets

(56) References Cited

U.S. PATENT DOCUMENTS

| | | | | |
|---|---|---|---|---|
| 4,653,706 A * | 3/1987 | Ragiab | ............... | B64F 1/10 114/262 |
| 4,826,235 A * | 5/1989 | Zwick | ............... | A47C 17/80 296/169 |
| 4,842,236 A * | 6/1989 | Yonts | ............... | B60P 7/0823 248/499 |
| 4,883,241 A * | 11/1989 | Snead | ............... | B64F 1/007 244/114 R |
| 4,949,986 A * | 8/1990 | Gohier | ............... | B60D 1/00 280/410 |
| 4,986,596 A * | 1/1991 | Gohier | ............... | B60D 1/00 280/410 |
| 5,375,902 A * | 12/1994 | Church | ............... | B60P 3/341 296/169 |
| 5,470,033 A * | 11/1995 | Tsai | ............... | B64F 1/10 104/245 |
| 6,371,410 B1 * | 4/2002 | Cairo-Iocco | ............... | B64C 25/30 244/100 A |
| 6,394,391 B1 * | 5/2002 | Lo | ............... | B64F 1/10 244/110 A |
| 6,695,255 B1 * | 2/2004 | Husain | ............... | B64C 25/68 244/110 E |
| 7,871,037 B2 * | 1/2011 | Kassai | ............... | B64F 1/10 244/110 E |
| 9,403,559 B1 * | 8/2016 | Hadley | ............... | B60P 3/00 |
| 10,207,621 B2 * | 2/2019 | Friemel | ............... | B60P 1/52 |
| 2006/0186625 A1 * | 8/2006 | Terpsma | ............... | B60D 1/00 280/47.35 |
| 2009/0007948 A1 * | 1/2009 | Dempsey | ............... | B60P 3/341 135/96 |
| 2013/0241177 A1 * | 9/2013 | Tiilikainen | ............... | B60D 1/02 280/408 |
| 2015/0321526 A1 * | 11/2015 | Scarth | ............... | B60D 1/481 280/457 |
| 2016/0272023 A1 * | 9/2016 | Abrahante | ............... | B62B 3/00 |

OTHER PUBLICATIONS

Aaron Knowles; In an in-flight Osprey emergency, maintenance crews take to the mattresses; Stars and Stripes; Mar. 22, 2019; <https://www.stripes.com/news/in-an-in-flight-osprey-emergency-maintenance-crews-take-to-the-mattresses-1.573821> (Year: 2019).*

* cited by examiner

MOBILE EMERGENCY LANDING PAD

This application is a Continuation-In-Part of U.S. patent application Ser. No. 15/648,279 filed on Jul. 12, 2017, which application is incorporated herein in its entirety.

BACKGROUND OF THE INVENTION

1. Field of the Invention

The present invention relates to a mobile emergency landing pad that is deployed to assist an aircraft that has the ability to land vertically, whenever the aircraft experiences a stuck gear emergency.

2. Background of the Prior Art

Many helicopters, especially military helicopters but also many civilian configured helicopters, have retractable landing gear that retracts internally into the fuselage after liftoff and during flight in order to reduce the aerodynamic signature of the aircraft. When the helicopter is about to land, the landing gear is lowered and the aircraft lands on the landing gear as needed. Sometimes, one or more axle sets of the landing gear fails to lower prior to landing, resulting in a situation called a hung gear or a stuck gear emergency. For whatever reason, the landing gear remains in either the fully retracted or partially retracted position, resulting in a dangerous landing configuration for the aircraft. If the aircraft attempts to land in this configuration, serious damage to the aircraft can result as can serious injury or death to the passengers of the aircraft and possibly others in the vicinity of the landing aircraft.

If a helicopter or other tiltrotor aircraft such as the V-22 Osprey experiences a hung gear during flight, and the aircraft crew cannot resolve the issue prior to the need to land the aircraft, ground personnel may attempt to assist the aircraft during its landing. Such assistance often includes the building of a makeshift structure at the landing site for the pilot to position the portion of the aircraft that is experiencing the hung gear onto the makeshift structure. Such structures can be anything from a table or chairs to a large pile of clothes and pillows. Such landing assistance can be of great benefit to an aircraft landing with a hung gear. However, such ad hoc solutions have certain drawbacks.

Many vertical landing capable aircraft, especially military aircraft, often have antennas, sophisticated lighting systems, and infrared vision systems located on the underside of the fuselage. Landing a heavy helicopter on a table set up at the landing site may otherwise save the aircraft and protect its passengers, yet result in substantial damage to these systems, resulting in costly repairs. Additionally, as such landing assistance solutions are by their nature makeshift and assembled with whatever is available at the landing site, possibly in a hurry, the structures can collapse when bearing the weight of the aircraft, resulting in potentially serious consequences for aircraft and crew alike.

What is needed is a system that can be used to help a vertical landing capable aircraft of safely landing, if the aircraft experiences a hung gear prior to landing. Such a system must be designed so as to protect the rather sensitive and expensive paraphernalia that may be found on the underbelly of many such aircraft so as to avoid costly repairs. Such a system must be sufficiently strong so as to be able to accommodate a large variety of aircraft without consideration as to which land gearing(s) is hung. Such a system must be relatively easy and quick to deploy so that the system can be configured and ready to receive an aircraft with minimal notice.

SUMMARY OF THE INVENTION

The mobile emergency landing pad of the present invention addresses the aforementioned needs in the art by providing a device that can be very quickly and relatively easily deployed to a vertical landing capable aircraft landing site and help an aircraft land whenever the aircraft is experiencing a hung gear. The mobile emergency landing pad is designed so as to cushion the underside of the aircraft that the device receives so as to protect any equipment, such as antennas, lighting systems, and infrared vision systems, that might be found on the underside of the aircraft and that might contact the mobile emergency landing pad due to such equipment's contact with the present invention. The mobile emergency landing pad is of relatively simple design and construction, being produced using standard manufacturing techniques, so as to be relatively inexpensive to produce, making the device economically attractive to potential consumers for this type of system. Deployment of the mobile emergency landing pad is very rapid and need only involve technicians having standard training in device usage.

The mobile emergency landing pad of the present invention is comprised of a trailer that has a top (a flat top), a bottom, a front end and an opposing back end with the front end and the back end joined by a first side and a corresponding second side. The trailer also has a series of wheels depending downwardly from the bottom. At least one resilient capture pad is removably seated on the top of the trailer. A connector extends from the front end of the trailer. The connector is hitched to a corresponding tow connector (ball hitch assembly) of a tow vehicle (or can be manually pulled). A strap has a first end that is attached to the first side of the trailer and a second end that is attached to the second side of the trailer such that the strap passes overtop the capture pad(s) in order to secure the capture pad(s) to the trailer. The connector is comprised of a main strut that extends outwardly from the front end of the trailer and an extension that is pivotally attached to the strut. A hitch ring is located on a distal end of the extension such that, the hitch ring connects to the ball of the ball hitch of the tow vehicle. A cover is located overtop the capture pad(s) and is either overtop the straps, underneath the straps, or used instead of the straps. A marking may be located on an outwardly facing surface of the cover and this marking may be imprinted via a reflective material. The capture pad is made from a high-density foam such as a high-density closed cell foam or other similar resilient material. A clip is located on the back end of the trailer in order to attach a second trailer to the first trailer.

BRIEF DESCRIPTION OF THE DRAWINGS

Similar reference numerals refer to similar parts throughout the several views of the drawings.

DESCRIPTION OF THE PREFERRED EMBODIMENT

Figure 1:
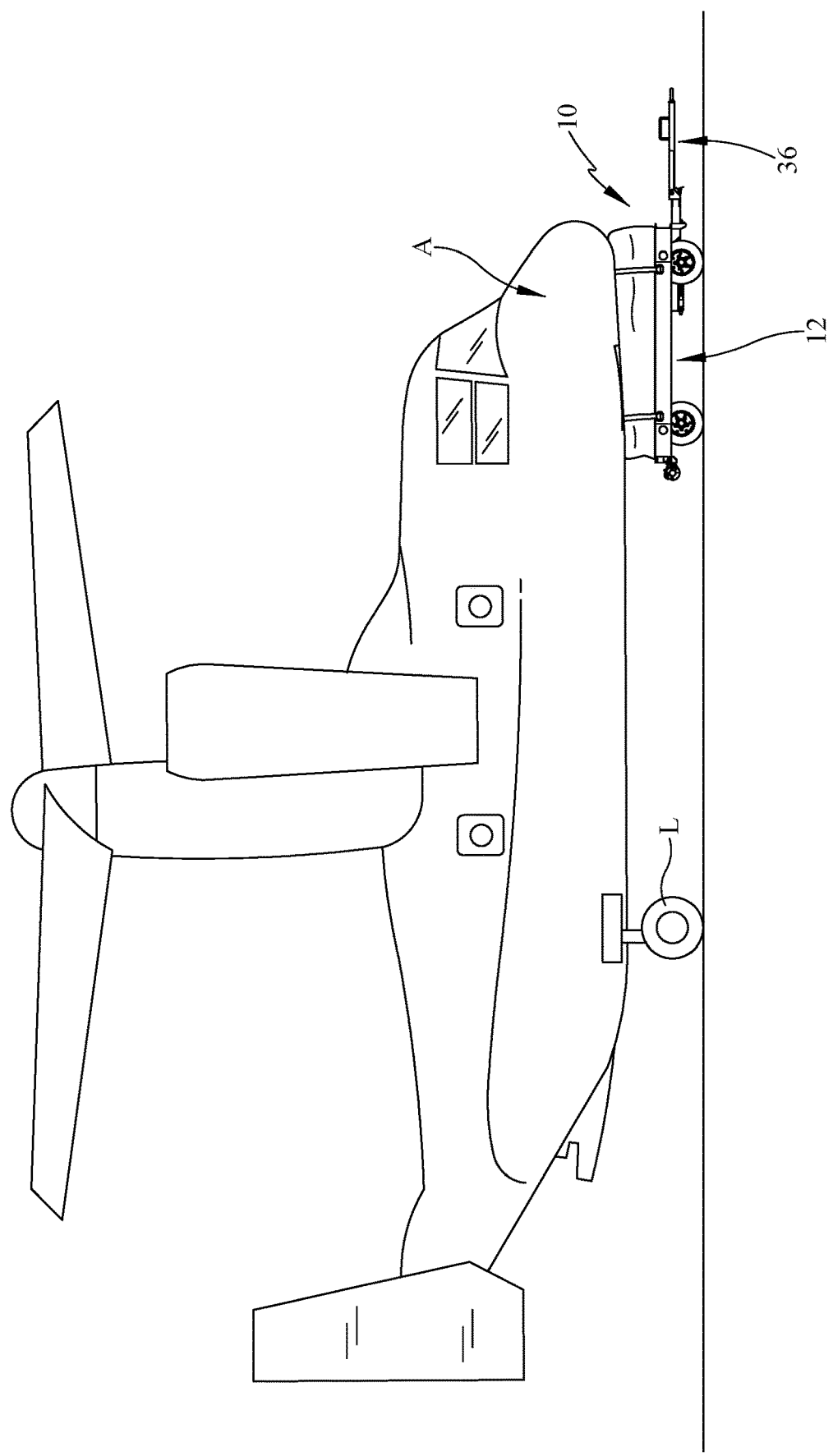
FIG. 1 is an environmental view of the mobile emergency landing pad of the present invention receiving a tiltrotor aircraft with a hung forward landing gear.

Referring now to the drawings, it is seen that the mobile emergency landing pad of the present invention, generally denoted by reference numeral 10, is comprised of a wheeled trailer 12 having a top 14 (which can be a flat member), a bottom, 16, a front end 18, and an opposing back end 20 joined by a first side 22 and a second side 24.

A forward axle set 26 extends downwardly from the bottom 16 of the trailer 12 proximate the front end 18 while a rear axle set 28 extends downwardly from the bottom 16 of the trailer 12 proximate the back end 20 thereof. Each axle set 26 and 28 is a typical axle set capable of bearing the weight which the mobile emergency landing pad 10 is to be subject to and has a pair of struts 30 that depend downwardly from the bottom 16 of the trailer 12 and terminate at an axle assembly 32, each axle assembly 32 having a wheel 34 rotatably located on either end thereof. The struts 30 may be shock absorbing struts, as illustrated, or may be fixed struts.

Figure 2:
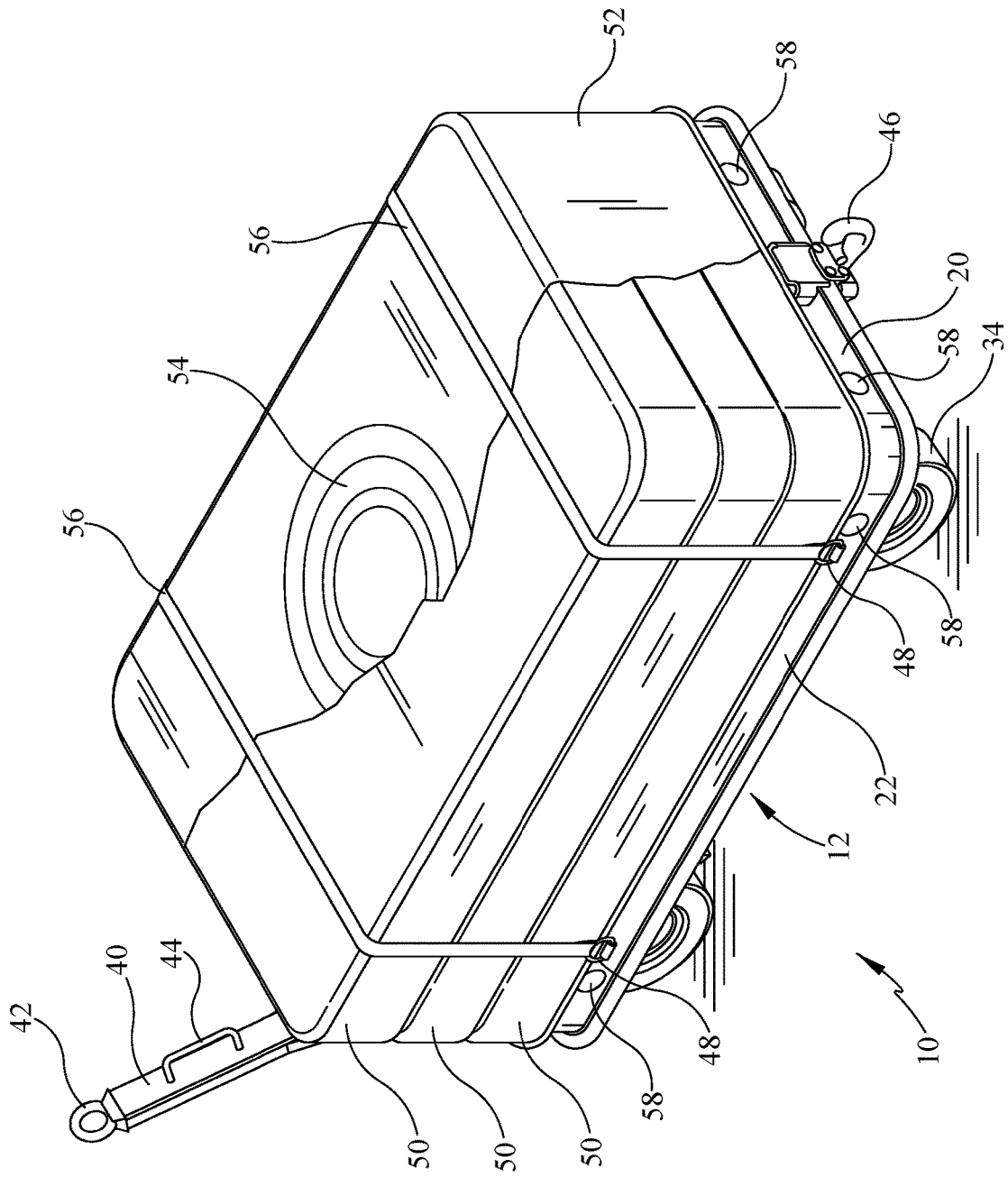
FIG. 2 is a perspective view, partially cut away, of the mobile emergency landing pad.
Figure 3:
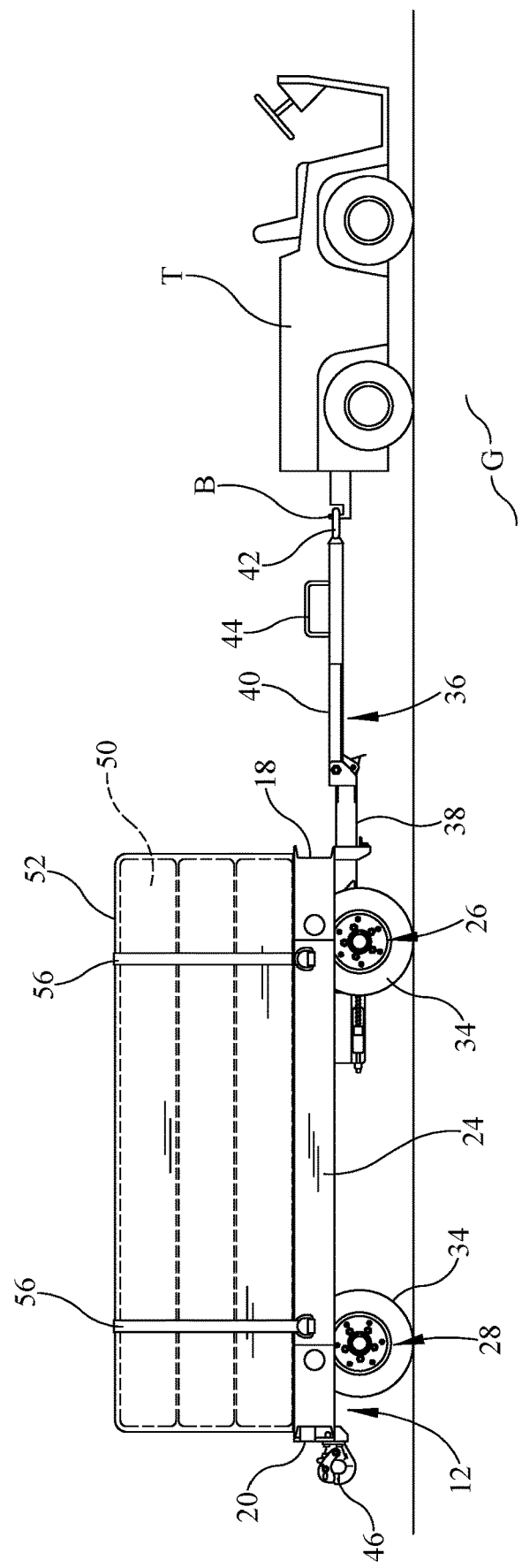
FIG. 3 is an elevation view of the mobile emergency landing pad.
Figure 4:
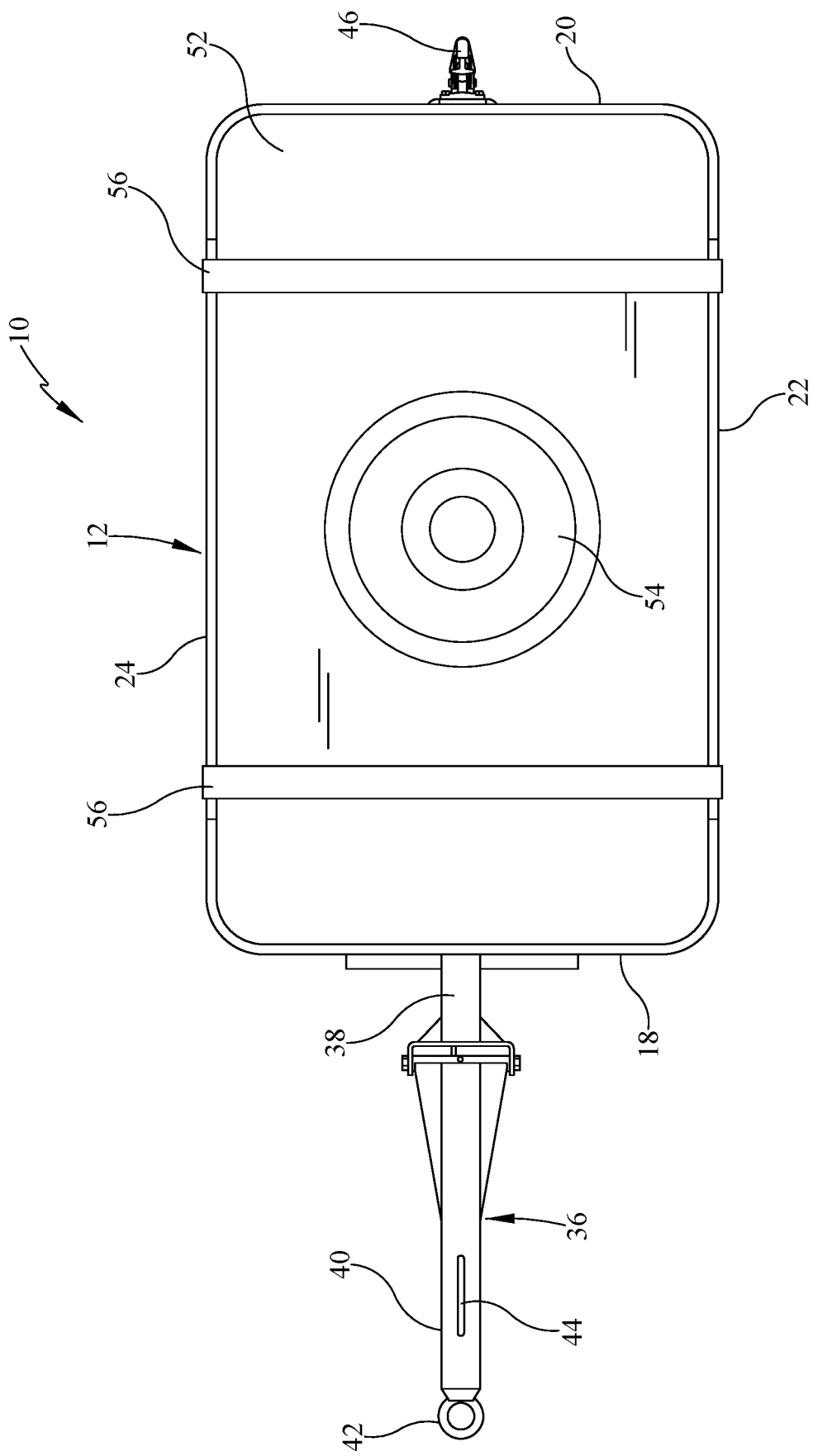
FIG. 4 is a plan view of the mobile emergency landing pad.
Figure 5:
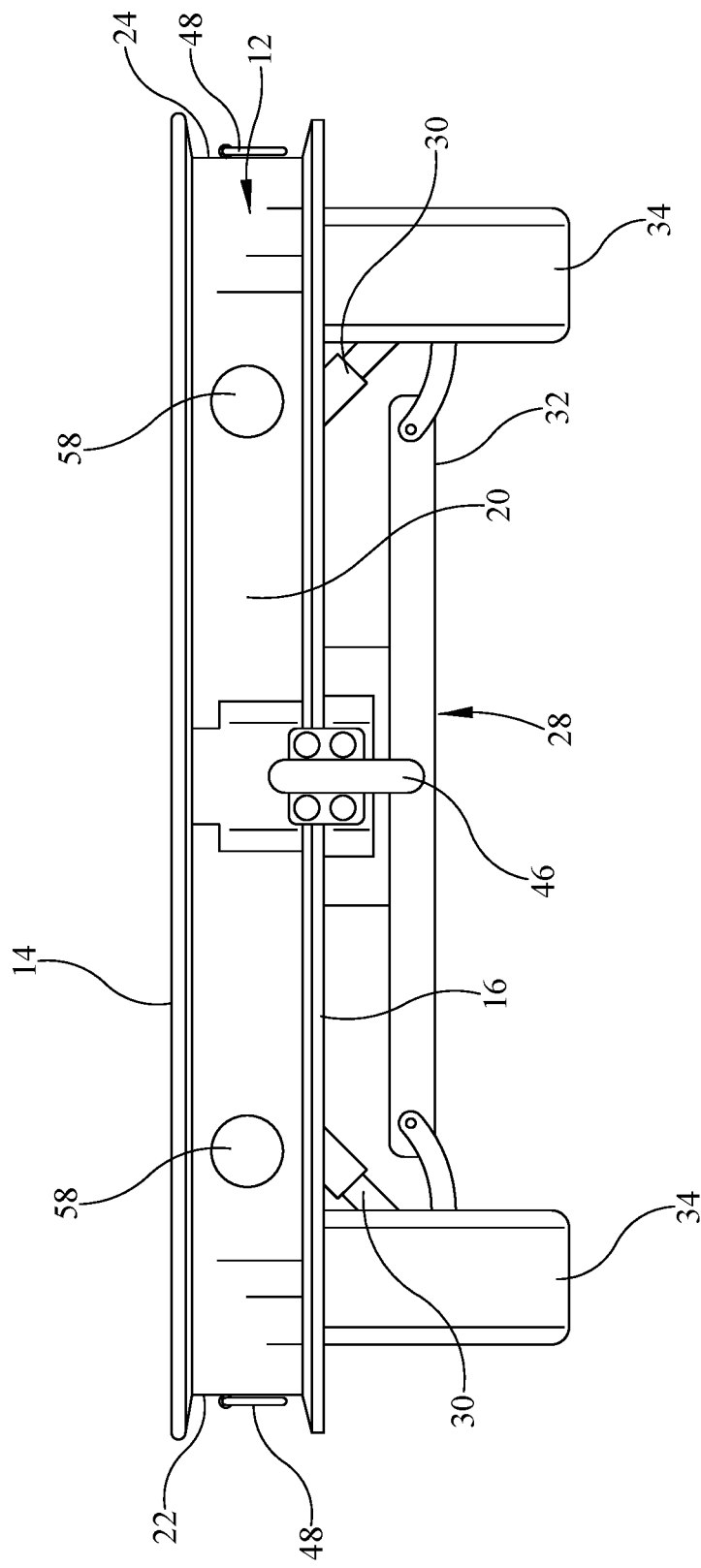
FIG. 5 is an end view of the mobile emergency landing pad.
Figure 6:
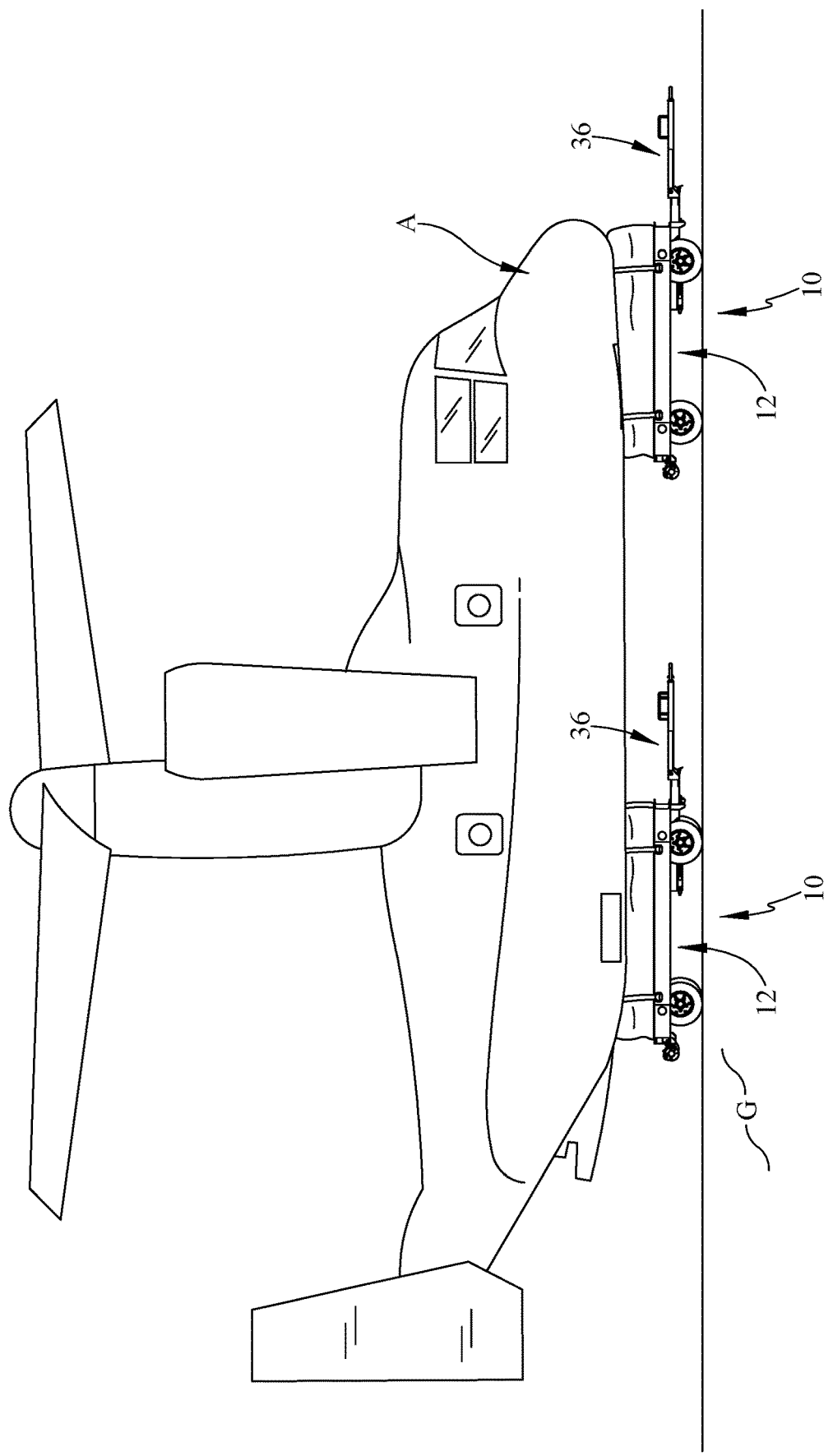
FIG. 6 is an environmental view of the mobile emergency landing pad receiving a tiltrotor aircraft with all landing gear hung.

Located on the front end 18 of the trailer 12 is a forward connector 36 that is comprised of a main strut 38 extending outwardly from the front end 18 and an extension 40 that is pivotally connected to a distal end of the main strut 38. The extension 40 is capable of pivoting between a raised position, as best seen in FIG. 2, and a lowered position wherein the extension 40 is generally horizontal and parallel with a ground surface G, an appropriate stop (not illustrated) maintaining the extension 40 in this horizontal position. As seen, a hitch ring 42 is located on a distal end of the extension 40 while a handle 44 is located along a length of the extension 40 in order to help pivot the extension 40 between its raised its the lowered position. A hitch clip 46 is located on the back end 20 of the trailer 12.

Two pairs of strap rings 48 are located along the sides 22 and 24 of the trailer 12. One pair of strap rings 48 located proximate the front end 18 of the trailer 12 and the other pair of strap rings 48 located proximate the back end 20 of the trailer 12. One strap ring 48 of each pair is located on the first side 22 of the trailer 12 while the other strap ring 48 of the pair is located on the second side 24 of the trailer 12.

One or more capture pads 50 are placed atop the trailer 12. Each capture pad 50 is dimensioned to fit essentially flush with the outer main frame of the trailer 12. Each capture pad 50 is a resilient member made from an appropriate material such as a very dense closed cell foam in order to be able to bear the weight of a portion of an aircraft A that the mobile emergency landing pad 10 is designed to capture.

In order to use the mobile emergency landing pad 10 of the present invention, the trailer 12 is stacked with one or more capture pads 50, the precise number of capture pads 50 being determined by the aircraft A that is to be captured. The combined height of the trailer 12 and its capture pads 50 should be approximately equal to the height above the ground G of the lower part of the fuselage of the aircraft A to be captured if the landing gear L of the aircraft were functional. Once the capture pads 50 are stacked onto the trailer 12, a cover 52 is placed over the capture pads 50 in order to protect the capture pads 50. The cover 52 is made from a sturdy material, such as heavy-duty canvas, in order to withstand any shear forces that may be exerted on the cover 52 by the aircraft A being captured. As seen, appropriate markings 54 can be located on the outer surface of the cover 52 in order to help guide a pilot onto the mobile emergency landing pad 10, such markings 54 may be imprinted in reflective material in order to aid the pilot in diminished lighting conditions. Once the cover 52 is in place, straps 56 are placed over the cover 52 and capture pads 50 such that one end of each strap 56 is attached to one of the strap rings 48 of one of the strap ring pairs and the opposing end of the strap 56 is attached to the corresponding strap ring 48 of the respective strap ring pair. Each strap 56 has an appropriate length adjustment system of any appropriate design (not illustrated) in order to allow a user to cinch the cover 52 and the capture pads 50 to the trailer 12 via the straps 56. Alternately, the straps 56 can be placed over the capture pads 50 and cinch them to the trailer 12 and thereafter the protective cover 52 placed over the capture pads 50 and straps 56 with the cover 52 attached to the remainder of the device in appropriate fashion such as tying the cover 52 to the strap rings 48—recognizing that this arrangement can eliminate the need for the straps 56.

Once the trailer 12 is properly configured, the trailer 12 is connected to a tug T by attaching the hitch ring 42 of the forward connector 36 to the ball B of the ball hitch H of the tug T. If additional trailers 12 are needed—an aircraft A with more than one landing gear set L failure, then the additional trailers 12 are connected to the first trailer 12 by clipping the hitch ring 42 of the second trailer 12 to the hitch clip 46 of the first trailer 12 and so on. Once all trailers 12 are connected, the tug T tows the trailers 12 to the landing area. At the landing area, each trailer 12 is decoupled from the other trailers 12 and is appropriately positioned as needed, either by the tug T and/or by personal at the landing area. If one of the trailers 12 is being dynamically positioned—being placed into position as the aircraft A makes its landing—then the use of the extension 40 helps give the personal positioning the trailer 12 a means by which to move the trailer 12 as well as give them some offset from the aircraft A proper as the aircraft A touches down on the top of the mobile emergency landing pad 10. The aircraft A makes its descent and lands atop the one or more trailers 12 with capture pads 50 in order to keep the aircraft A off of the ground G. The resilient nature of the capture pads 50 cushions the aircraft A as it touches down upon the mobile emergency landing pad 10.

Reflectors 58 may be located on the trailer 12 for visibility of the trailer 12

While the invention has been particularly shown and described with reference to embodiments thereof, it will be appreciated by those skilled in the art that various changes in form and detail may be made without departing from the spirit and scope of the invention.

I claim:

1. An emergency landing pad for capturing a human piloted and enclosed cockpit, occupied aircraft, the aircraft having a landing gear system comprising at least one oleo-strut-based landing gear set, wherein the at least one oleo-strut-based landing gear set bears a portion of the total gross weight of the aircraft whenever the aircraft is on a ground surface, the emergency landing pad comprising:

a trailer having a top, a bottom, a front end and an opposing back end, the front end and the back end joined by a first side and a corresponding second side, the trailer also having a series of wheels depending downwardly from the bottom;

a first resilient capture pad having a downwardly facing lower surface seated on the top of the trailer, and an opposing upwardly facing upper surface, the first capture pad made from a dense foam;

a connector extending from the front end of the trailer, the connector adapted to be connected to a corresponding tow connector of a tow vehicle;

a strap having a first end attached to the first side of the trailer and a second end attached to the second side of the trailer such that the strap passes overtop the first capture pad in order to secure the capture pad to the trailer; and wherein during an emergency landing, the emergency landing pad is adapted to receive only a section of the aircraft proximate to a location of the at least one oleo-strut-based landing gear set on an upper surface of the capture pad and the emergency landing pad is dimensioned and structured to bear the portion of the total gross weight of the aircraft that would be borne by the at least one oleo-strut-based landing gear set.

2. The emergency landing pad as in claim 1 wherein the connector is comprised of a main strut extending outwardly from the front end of the trailer and an extension pivotally attached to the strut.

3. The emergency landing pad as in claim 2 further comprising a hitch ring located on a distal end of the extension, the hitch ring adapted to connect to a ball of a ball hitch of the tow vehicle.

4. The emergency landing pad as in claim 1 further comprising a cover located overtop the first capture pad.

5. The emergency landing pad as in claim 4 further comprising a marking located on an outwardly facing surface of the cover.

6. The emergency landing pad as in claim 5 wherein the marking is imprinted via a reflective material.

7. The emergency landing pad as in claim 4 wherein the cover is attached to the trailer.

8. The emergency landing pad as in claim 1 further comprising a cover located overtop the capture pad such that the strap also passes over the cover.

9. The emergency landing pad as in claim 8 further comprising a marking located on an outwardly facing surface of the cover.

10. The emergency landing pad as in claim 9 wherein the marking is imprinted via a reflective material.

11. The emergency landing pad as in claim 1 wherein the capture pad is made from a high-density foam.

12. The emergency landing pad as in claim 1 wherein the capture pad is made from a high-density closed cell foam.

13. The emergency landing pad as in claim 1 further comprising a clip located on the back end of the trailer.

14. The emergency landing pad as in claim 1 further comprising a second resilient capture pad seated on the top of the trailer between the trailer and the first capture pad, the second capture pad made from a dense foam.

15. The emergency landing pad as in claim 1 wherein the upwardly facing surface of the first capture pad is flat.

* * * * *